(12) United States Patent  (10) Patent No.: US 8,131,051 B2
Heath et al.  (45) Date of Patent: Mar. 6, 2012

(54) ADVANCED AUTOMATIC DIGITAL RADIOGRAPHIC HOT LIGHT METHOD AND APPARATUS

(75) Inventors: Michael D. Heath, Rochester, NY (US); William J. Sehnert, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 13/168,371

(22) Filed: Jun. 24, 2011

(65) Prior Publication Data

US 2011/0255766 A1  Oct. 20, 2011

Related U.S. Application Data

(63) Continuation of application No. 11/550,018, filed on Oct. 17, 2006, now abandoned.

(51) Int. Cl.
*G06K 9/00* (2006.01)
*G06K 9/40* (2006.01)

(52) U.S. Cl. .................................... 382/132; 382/274

(58) Field of Classification Search .................. None
See application file for complete search history.

(56) References Cited

U.S. PATENT DOCUMENTS

| | | |
|---|---|---|
| 4,908,876 A | 3/1990 | DeForest et al. |
| 5,446,833 A | 8/1995 | Miller et al. |
| 5,533,511 A | 7/1996 | Kaspari et al. |
| 5,542,603 A | 8/1996 | Macduff |
| 5,546,091 A | 8/1996 | Haugen et al. |
| 5,633,511 A | 5/1997 | Lee et al. |
| 5,740,267 A | 4/1998 | Echerer et al. |
| 5,892,842 A | 4/1999 | Bloomberg |
| 6,017,309 A | 1/2000 | Washburn et al. |
| 6,047,042 A | 4/2000 | Khutoryansky et al. |
| 6,414,693 B1 | 7/2002 | Berger et al. |
| 6,614,489 B1 | 9/2003 | McIntyre |
| 6,674,444 B1 | 1/2004 | Tahara |
| 6,735,330 B1 | 5/2004 | Van Metter et al. |
| 6,791,584 B1 | 9/2004 | Xie |
| 6,862,014 B2 | 3/2005 | Ohtani et al. |
| 2003/0012453 A1 | 1/2003 | Kotlikov et al. |
| 2004/0057632 A1 | 3/2004 | Gindele |
| 2004/0224756 A1 | 11/2004 | Suzuki et al. |

FOREIGN PATENT DOCUMENTS

EP  0 638 874  2/1995

OTHER PUBLICATIONS

Adobe Photoshop (software), Adobe Systems, San Jose, California.
W.K. Pratt, "Digital Image Processing", (text book) Third Edition, ISBN-10: 0471374075, Publisher: John Wiley & Sons, Inc., pp. 2.
PCT International Search Report, International Application No. PCT/US2007/021695, International filing date: Nov. 10, 2007, pp. 2.

*Primary Examiner* — Michelle Entezari

(57) ABSTRACT

A method for automatically modifying the rendering of an image based on an analysis of pixel values within a selected region of interest. The method includes: providing a digital input image of digital pixel values and tone scale look-up table (LUT); creating a default rendered image by applying the tone scale lookup table to the input image; displaying the default rendered image; selecting a region of interest from the input image; computing the histogram of the pixel values within the region of interest; creating a bright light image by remapping the pixel values within the region of interest based on an analysis of the histogram and the tone scale table.

19 Claims, 5 Drawing Sheets

ADVANCED AUTOMATIC DIGITAL
RADIOGRAPHIC HOT LIGHT METHOD AND
APPARATUS

CROSS REFERENCE TO RELATED
APPLICATIONS

This application is a Continuation of U.S. Ser. No. 11/550,018 filed on Oct. 17, 2006 now abandoned entitled ADVANCED AUTOMATIC DIGITAL RADIOGRAPHIC HOT LIGHT METHOD AND APPARATUS to Heath et al., which published as 2008/0089602.

FIELD OF THE INVENTION

This invention relates in general to image enhancement in digital image processing and more particularly to the enhanced rendering of selected regions of interest to improve the visual presentation of image details, specifically radiographic image details.

BACKGROUND OF THE INVENTION

Digital medical imaging has become increasingly important in medical imaging practice and has increased productivity for health care professionals who need to utilize images as part of patient care. It is desirable that a user be able to rapidly extract diagnostically useful information from medical images and that any user interaction with the image display be rapid, intuitive and as automated as possible.

One source of medical images is the detection of x-rays projected through a region of interest of a patient so as to measure the x-ray transmittance with an imaging detector such as used in computed radiography and direct digital radiography. Because the digital radiographic image can capture a wide range of x-ray exposures, a tone scale curve is used to selectively map input code values to output code values for presentation on a display. Because there are often regions of the image that are too dark or too light, there is a need to automatically improve the contrast and brightness in these regions without affecting the tone scale of the rest of the image. When printed films and a light box are used for the display of radiographs, an ancillary intense source of light (hot light) aids in aiding visualization of dark areas. However, the hot light is of no help in visualizing too light areas and there is no contrast enhancement in the area of interest.

When radiographic (medical) images are viewed with electronic displays, the user must adjust window width and level to improve rendering of the region of interest. This process requires skill and is time consuming and can result in suboptimal rendering of the rest of the image. U.S. Pat. No. 5,542,003, issued Jul. 30, 1996, inventor Wofford, describes a method for automatically adjusting the window and level parameters. The commercial image editing and manipulation application Adobe Photoshop (Adobe Systems inc., San Jose, Calif.), U.S. Pat. No. 6,017,309, issued Jan. 25, 2000, inventors Washburn et al. and U.S. Pat. No. 6,047,042, issued Apr. 4, 2000, inventors Khutoryansky, et al., describe various image processing techniques that are of interest, but which do not solve the problem of rendering dark or light regions of a displayed radiographic image so that they are visually improved.

U.S. Pat. No. 6,735,330, issued May 11, 2004, inventors Van Metter et al., describes a method for automatically modifying the rendering of a digital radiographic image based on an analysis of pixel values within a selected region of interest. The method includes: providing a digital input image of digital pixel values and tone scale look-up table; creating a default rendered image by applying the tone scale look-up table to the input image; displaying the default rendered image; selecting a region of interest from the input image; computing the histogram of the pixel values within the region of interest; creating a bright light image by remapping the pixel values within the region of interest based on an analysis of the histogram and the tone scale look-up table and overlaying the bright light image on the default rendered image. While the method may solve a problem discussed above, it is desirable to provide an improved method that would address other image processing and rendering needs.

SUMMARY OF THE INVENTION

According to the present invention, there is provided an improved method for automatically modifying the processing and rendering of a digital radiographic image.

According to one aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; creating a bright light image by remapping the pixel values within said region of interest based on an analysis of said histogram and said tone scale table; wherein said tone scale lookup table has been adjusted by one or more of increasing or decreasing the overall contrast and of reversing the polarity; and overlaying said bright light image on said default rendered image.

According to another aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image on a color display; selecting a region of interest from said input image; computing the histogram of the pixel values within said region of interest; creating a bright light image by remapping the pixel values within said region of interest based on an analysis of said histogram and said tone scale table; wherein said tone scale lookup table is transformed into a pseudo-color palette; and overlaying said bright light image on said default rendered image.

According to still another aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; processing said region of interest by means of trend removal; creating a bright light image by remapping the pixel values within said region of interest based on an analysis of said histogram and said tone scale table; and overlaying said bright light image on said default rendered image.

According to another aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; processing said region of interest with spatial frequency processing; creating a bright light image by remapping the pixel values within said region of interest based on an analysis of said histogram and said tone scale table; and overlaying said bright light image on said default rendered image.

According to a further aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; creating a bright light image by remapping the pixel values within said region of interest based on an analysis of said histogram and said tone scale table; magnifying said bright light image; and overlaying said magnified bright light image on said default rendered image such that the center of the original bright light image becomes the center of the overlay image.

According to a still further aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; creating a bright light image by remapping the pixel values within said region of interest based on an analysis of said histogram and said tone scale table; overlaying said bright light image on said default rendered image; and storing said bright light image with said original image.

According to one more aspect of the present invention there is provided a method for automatically modifying the rendering of an image based on an analysis of pixel values within a selected region of interest comprising: providing a digital input image of digital pixel values and tone scale look-up table (LUT); creating a default rendered image by applying said tone scale lookup table to said input image; displaying said default rendered image; selecting a region of interest from said input image; computing the histogram of the pixel values within said region of interest; creating a bright light image by remapping the pixel values within said region of interest based on an analysis of said histogram and said tone scale table; and overlaying said bright light image on said default rendered image so that said overlay image displays in true size.

The invention has some advantages. For example, the context of the original image is maintained by operating only on the selected region of interest, the remainder of the image is unchanged. In addition, the image quality of the selected region of interest is improved over traditional window and level adjustment, because the contrast of the selected region of interest is increased without incurring quantization due to the toe and shoulder of the tone scale look-up table application. The region of interest can be processed by trend removal and/or spatial frequency processing to aid the user in visualizing details and texture that are ordinarily masked. The region of interest can be transformed with a color palette to additionally improve detail visualization. The region of interest can be displayed magnified or in its true size to improve visualization of the ROI image. The ROI overlay(s) can be stored along with the original image so that they can be used for future reference, perhaps identifying key findings within an image.

DETAILED DESCRIPTION OF THE INVENTION

In general, the present invention automatically provides an improved rendering of a user selected region of interest of a displayed digital (radiographic) image. Regions of the image that have been rendered too dark or too light are remapped to pixel values that are well rendered by the tone scale look-up table. While the visibility of the region of interest is improved, no loss of visual context is suffered because the rendering of the overall image remains the same.

Figure 1:
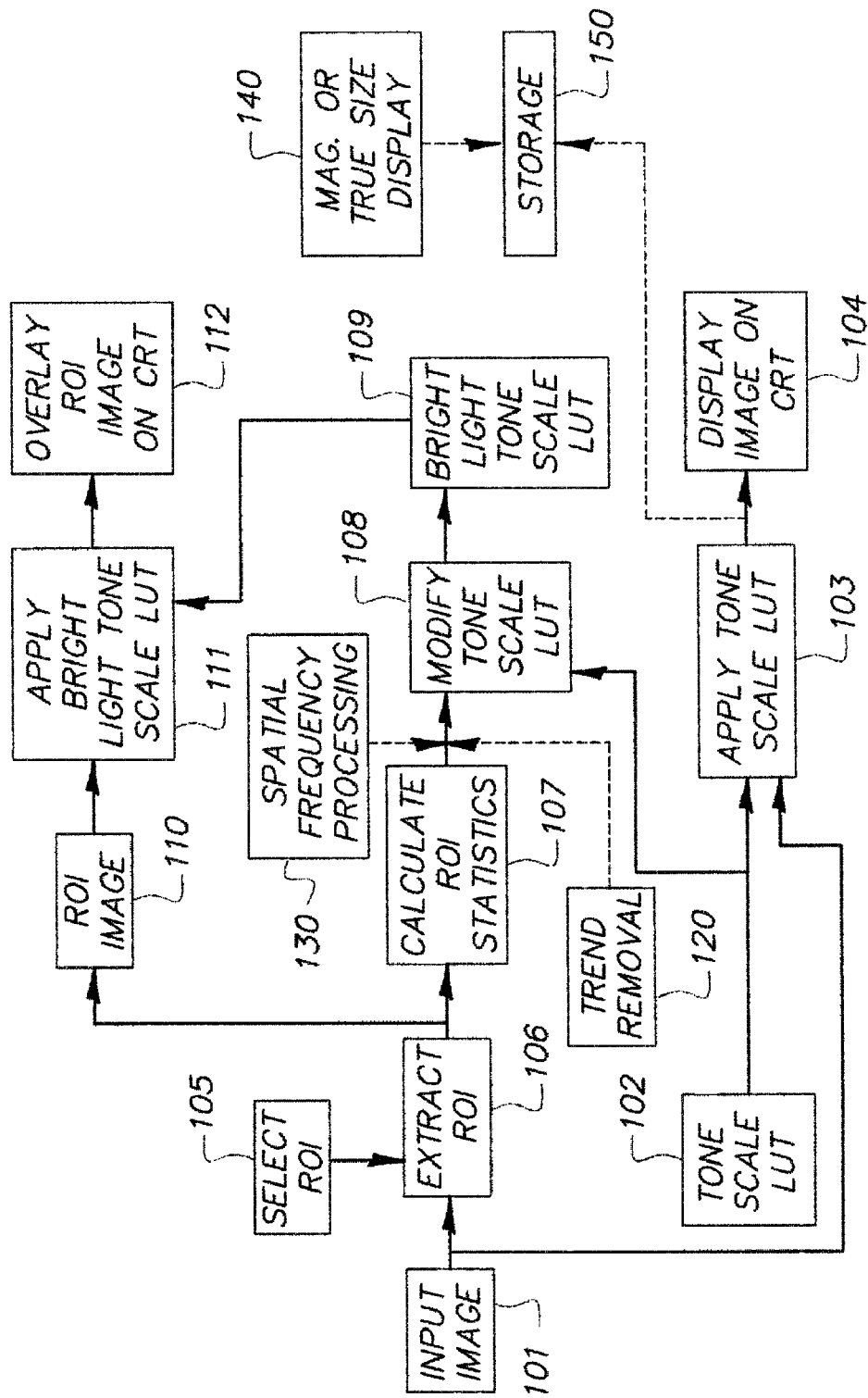
FIG. 1 is a block diagram of a digital radiographic bright light processing chain.

An environment for the present invention is shown in FIG. 1. A digital radiographic image 101 of digital code values is selected for viewing. The digital radiographic image can be generated by computed radiography (CR) or direct digital radiography (DR) or by digitizing radiographic film. A tone scale (LUT) look-up table 102 is provided which is a default tone scale rendering to best visualize the entire dynamic range of the input image 101. Although the creation of the tone scale LUT 102 is outside of the scope of the present invention, preferably the tone scale LUT 102 is calculated, such as described in U.S. Pat. No. 5,533,511, issued May 27, 1997, inventors Lee et al. The tone scale LUT 102 and the input image 101 are provided to the apply tone scale LUT 103 processing step. Apply tone scale LUT 103 creates a new image whereby the code values from the input image are remapped through tone scale LUT 102. Additional processing such as spatial enhancement and dynamic range compression may be applied to the original image 101 or the output image from step 103. However, this processing is ancillary to the present invention. The image from step 103 is displayed via display image module 104. The apply tone scale LUT processing 103 may be performed by hardware, firmware, or software. Hardware implementation can result in higher performance over software implementation. The rendering presented to the user at this point is optimized to visualize the entire image area. Particular regions of the image can now be selected and enhanced apart from the full image.

The user selects a region of interest, select ROI 105, by a display tool that can be a circle, a rectangle, or an arbitrary polygon. The display tool can be moved on the display displaying the radiographic image by means of a pointing device, such as a mouse or track ball, or by means of arrow keys on a keyboard to select the region of interest.

The image region specified by the select ROI 105 step is copied from the input image into a ROI image 110 in the extract ROI 106 step. Next, calculate ROI statistics 107 is performed on the output of extract ROI 106 step. Step 107 can be performed by obtaining a histogram of the region of interest selected, and computing the mean of the code values, the median of the code values, a percentile measure of the code values (e. g., 40%), or the mean of a fixed number of pixels oriented about the center of the ROI, independent of the size of the ROI used.

The tone scale LUT 102 is then processed by the modify tone scale LUT 108 module using the output of calculate ROI statistics 107 to create a bright light tone scale LUT 109. One algorithm for use in step 108 is as follows. First an aim code value, CV aim, is determined by finding the input code value in the tone scale LUT 102 which produces a code value equal to the mid-level of the output range. The mid-level of the output range equals (max output CV−minimum output CV)/2, rounded to the nearest integer. The bright light tone scale LUT 109 is then calculated such that the LUT output, CV out, equals:

$$CVout = ToneScaleLut[CVin - beta(CVmean - CVaim)]$$

For all CVin, where ToneScaleLut is the tone scale LUT 102, CV mean equals the value determined in calculate ROI statistics 107, and beta is a constant set to 0.7 in the preferred embodiment. If the value of:

$$CVin - beta(CVmean - CVaim)$$

is outside of the domain to Tonescale LUT, the minimum (or maximum) input value shall be used as the index into ToneScaleLut.

Figure 2:
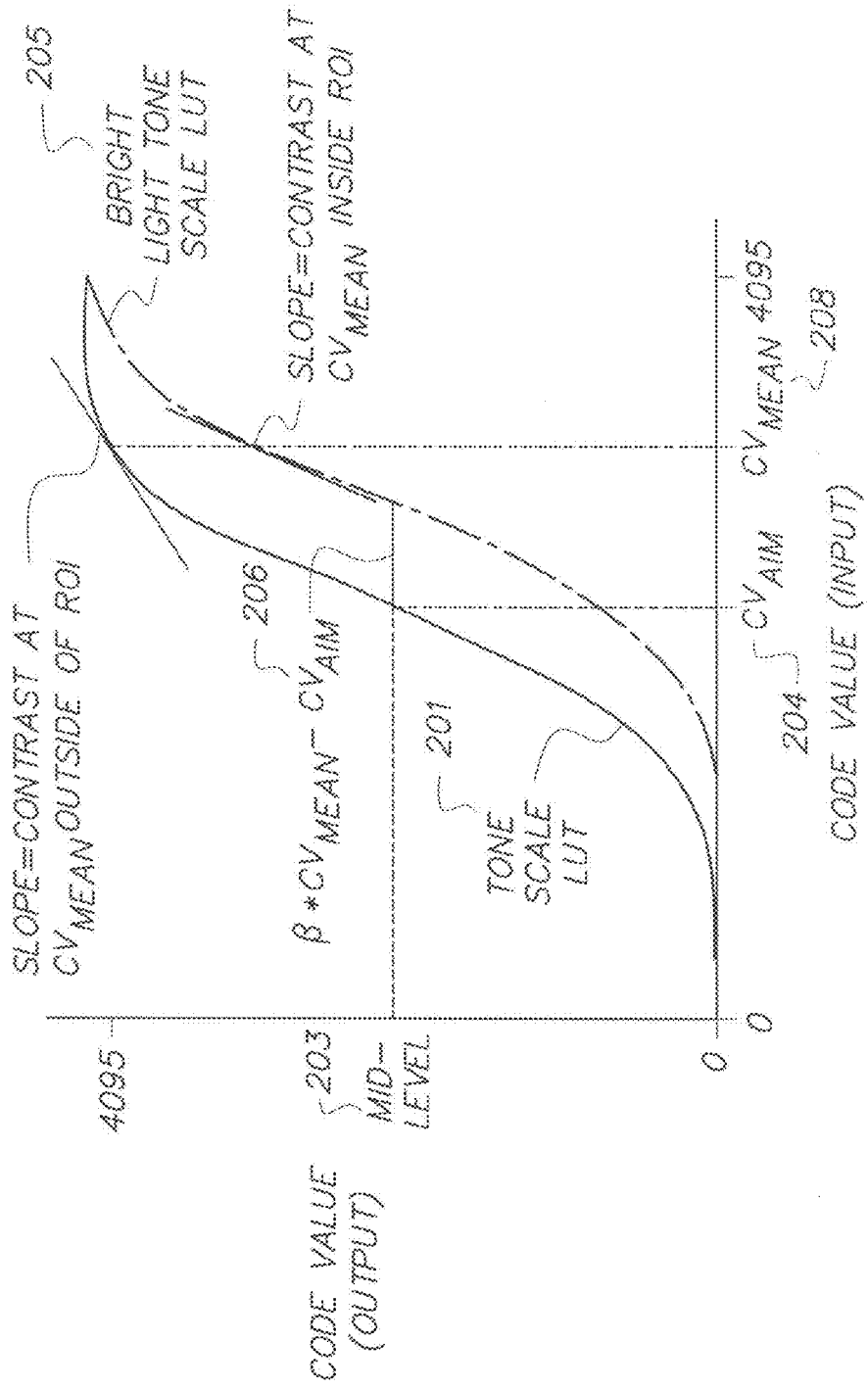
FIG. 2 is a graphical representation useful in explaining the present invention.

A graphical example of the algorithm described above is shown in FIG. 2. An example tone scale LUT 201 is shown. This is the LUT that is applied as the initial presentation for the entire image. Also, CVmean 202 value is depicted from a hypothetical selected region of interest. First CVaim 204 is found. This is defined as the input code value that corresponds to the mid-level 203 of the output range. In the example, the mid-level 203 value is (4095−0)/2. rounded to the nearest integer. CVaim 204 is found by searching the tone scale LUT 201 for the input code value that yields an output of mid-level 203. The calculation of the bright light tone scale LUT 205 can be depicted by shifting the tone scale LUT 201 by the value of beta*(CVmean−CVaim) 206. The increase in contrast achieved in the selected region of interest can be seen by the change in slope for the tone scale LUT 201 at an input code value of CVmean versus the slope for the bright light tone scale LUT 205 at an input code value CV mean.

Other modifications of the tone scale LUT other than by shifting is a feature of the present invention. These include adjusting the tonescale LUT to increase or decrease its overall contrast, and reversing the polarity of the tone scale LUT. Altering the contrast, and/or reversing the polarity of the tone scale LUT is calculated such that the LUT output, CVout equals:

$$CVout = TonescaleLUT[alpha \times (CVin - CVmean) + CVmean - beta \times (CVmean - CVaim)]$$

Figure 4:
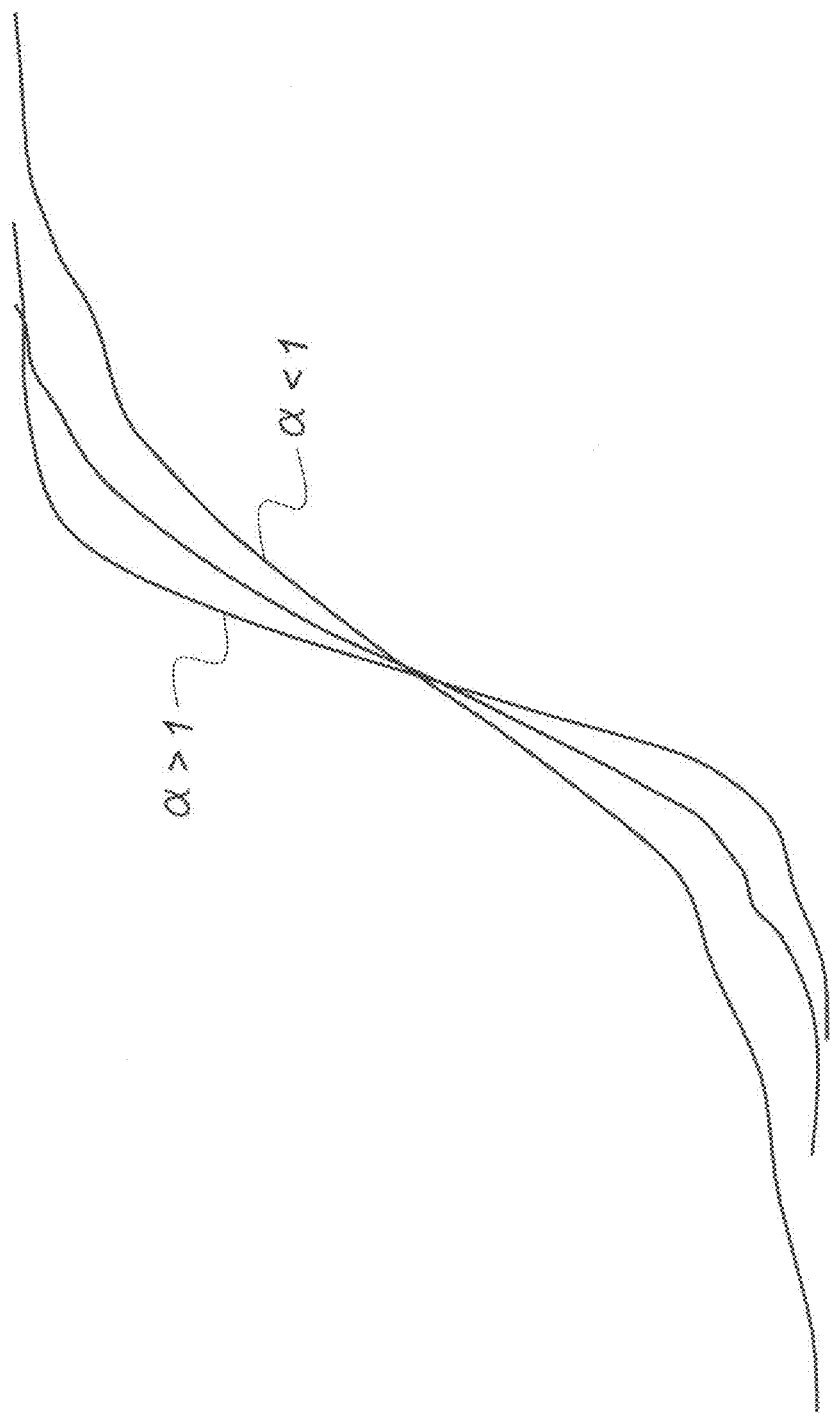
FIG. 4 is a graphical representation useful in explaining an aspect of the present invention.

This is illustrated in FIG. 4 which illustrates increasing (alpha>1) or decreasing (alpha<1) the contrast from the input tone scale.

Altering the contrast will be helpful when the default tonescale does not provide the contrast desired by the user. Reversing the polarity with this method has the advantage of not inducing unnecessary flare that might occur when there is a considerable amount of black area in the default rendering. In general, the parameter alpha should remain adjustable to suit user preferences. To achieve a reversal in the polarity, it is only necessary to multiply alpha by the factor of −1.

Referring again to FIG. 1, the bright light tone scale LUT 109 and the ROI image 110 are used in the apply bright light tone scale LUT 111 processing to create an image for display which is then overlaid on the display by the overlay ROI image on CRT 112 process. This process can be carried out using hardware, firmware or software.

Figure 3:
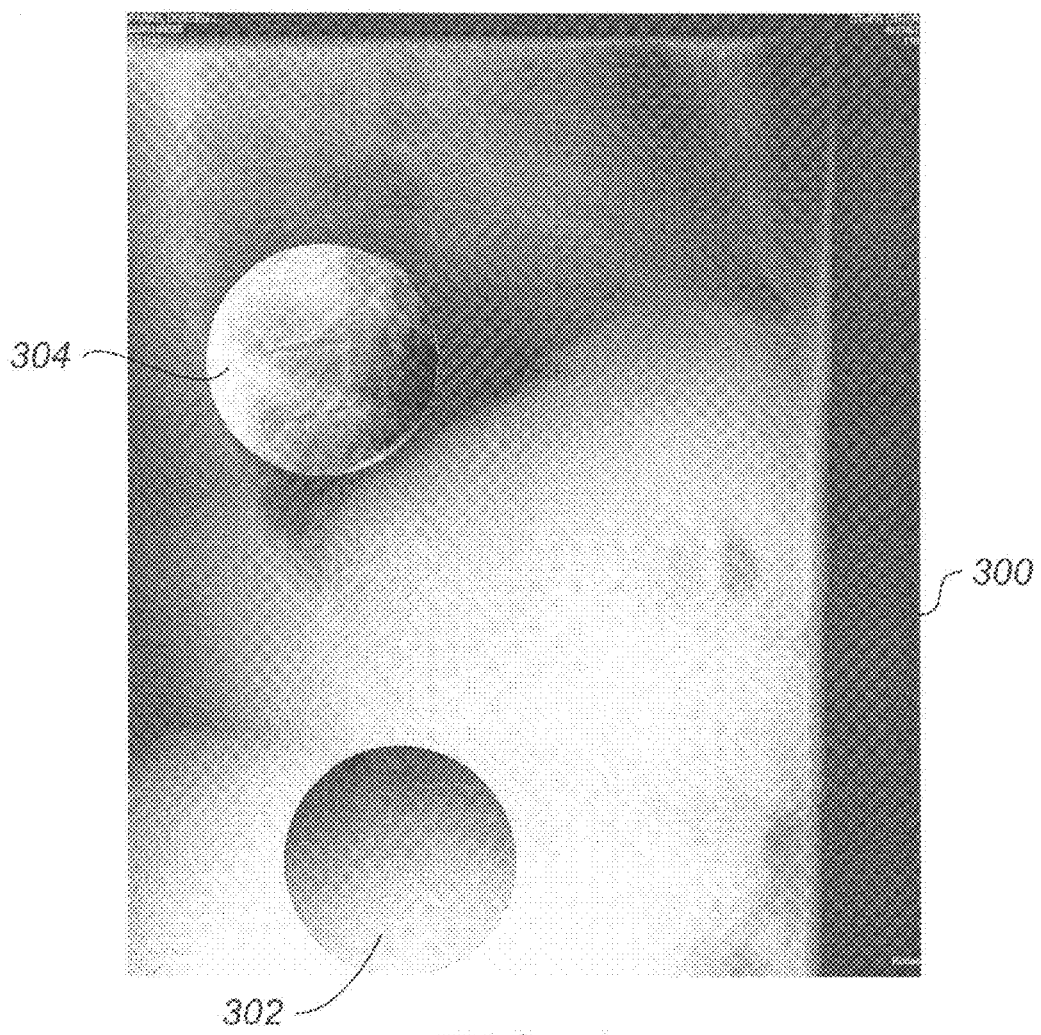
FIG. 3 is an example radiographic image with two bright light regions of interest.

The selected region of interest is now rendered at improved contrast, while the context of the radiographic image is preserved. Multiple bright light regions may be created or one selected region may be scrolled across the image, while the algorithm constantly operates on the updated selected region of interest. Further, to reduce viewing flare, the tone scale LUT 102 may be modified to darken the input image 101 when the overlay ROI image on display 112 processing step is performed. FIG. 3 depicts an example radiographic image with two bright light regions of interest. As shown, radiographic image 300 has bright light regions of interest 302 and 304.

Other features of the present invention are as follows.

1. The image can be rendered onto a color output display. (FIG. 1, display 104). Specifically, output of the modified tonescale LUT is further transformed into a pseudo-color palette, (FIG. 1, process 108) which transforms a grayscale-based rendering into one that is capable of exhibiting non-trivial color components. Such transformations can be utilized to additionally improve detail visualization. Examples of how this transformation can be carried out in practice are discussed in the following reference—W. K. Pratt, "Digital Image Processing," Third Ed., John Wiley & Sons, Inc, (2001).

2. The region of interest selected can be processed by trend removal including removing a fitted polynomial surface, e. g., plane or quadratic surface from the region of interest. (See: FIG. 1, box 120). The trend removal provides a benefit in that edge details and texture become easier to visually assess.

3. As represented by block 140 of FIG. 1, other means for overlaying the enhanced region of interest can be carried out. One such means is to enhance the region of interest by any of the described methods, to magnify the enhanced region of interest, and to overlay the enhanced and magnified region of interest onto the original image such that the center of the original ROI becomes the center of the overlay image. Another means is to enhance the ROI and to overlay the enhanced ROI so that it displays as true size.

4. Another feature of the present invention is to provide the capability to store the enhanced and displayed ROI(s) along with the original image, so that they remain persistent with the original image. (See: FIG. 1, box 150). The advantage of storage is that these overlays can be used for future reference, perhaps identifying key findings within an image. The persistence of the enhanced ROI(s) can be accomplished by:

a. Storing the enhanced ROI(s) as a bitmapped file;
b. Storing the placement parameters (e. g., the coordinate location on the original image where the top left corner of the enhanced region of interest should be located) into a database:
c. Providing a database entry that unites the original image with the one or more enhanced ROI overlays.

5. The region of interest can be processed using spatial frequency processing, by means of unsharp masking, multi-resolution filtering, or multiresolution morphological filtering. (See; FIG. 1, box 130) Such enhancement is intended to aid the user in visualizing details and features that might otherwise be difficult to see without additional processing or to enhance features that may be degraded during softcopy viewing. In the preferred embodiment a multiresolution filtering would be utilized on the region of interest for enhancement and the frequency subbands would be modulated to increase the transfer of frequency information to the human observer.

Figure 5:
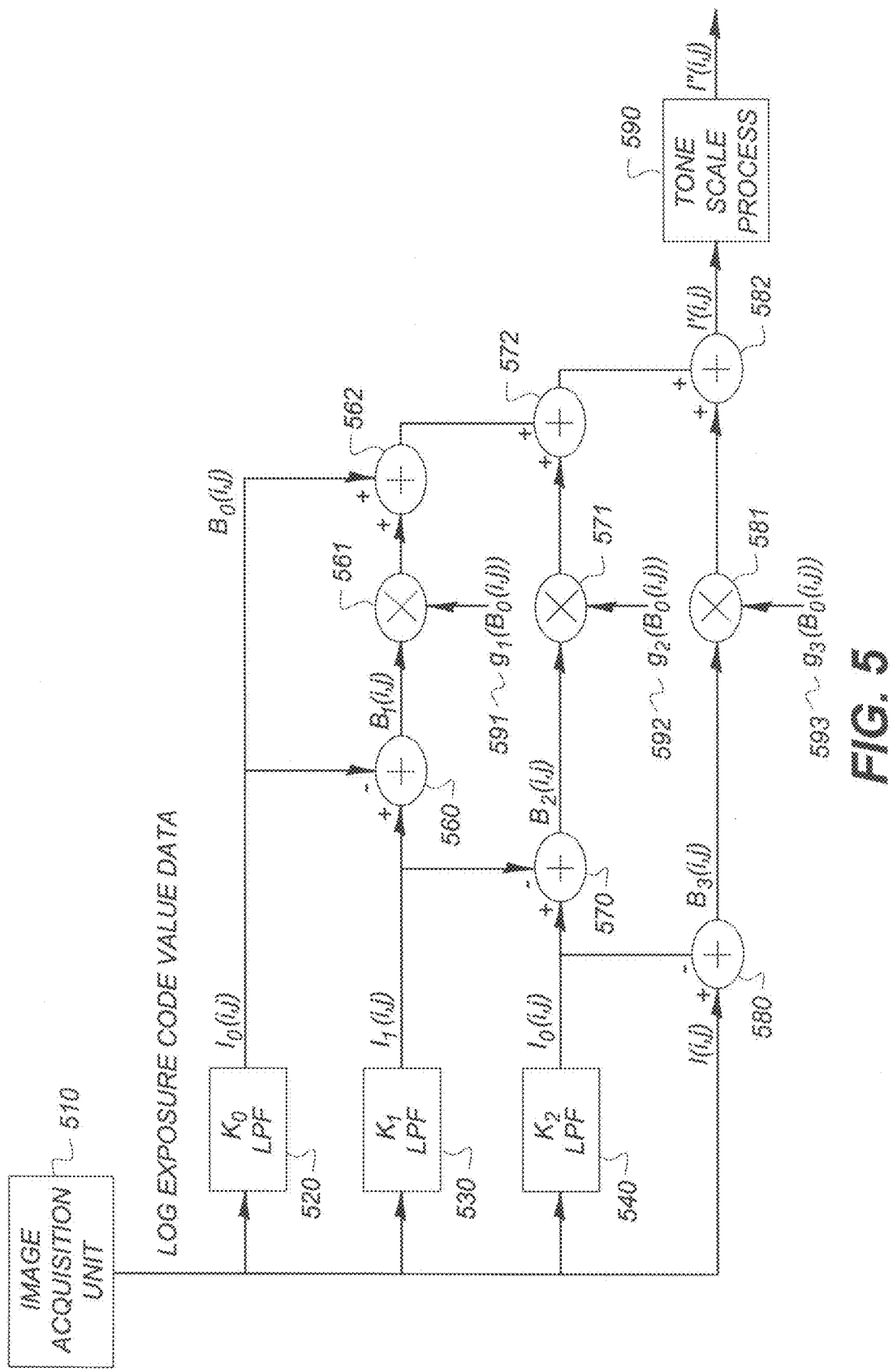
FIG. 5 is a diagrammatic view illustrating a multiresolution frequency enhancement process.

Referring now to FIG. 5, there will be described a multi-resolution frequency enhancement process. As shown, digital image acquisition unit 510 provides a digital image which is first processed by three low-pass filter operators 520, 530, and 540. Each operator uses a square wave or other filter, such as a Gaussian-shaped filter. The filter kernel sizes are chosen to manipulate different sized features (or different frequency ranges) in the image. The first low pass filter operator 520 uses kernel K0. The operator uses the largest kernel size and it passes only the lowest frequencies. It generates the low-pass image $I0(i,j)$ The next low-pass operator 530 uses kernel K1. This operator uses the next largest kernel size and it passes the low to mid frequencies. It generates the low-pass image $I1(i,j)$. The final low-pass operator 540 uses kernel K2. This operator uses the smallest kernel size and it passes all frequencies except for the very highest. It generates the low-pass image $I2(i,j)$. The low-pass images are used to generate the frequency bands. The lowest frequency band image is $B0(i,j)$ and is equal to $I0(i,j)$. This band represents large-sized features in the image and contains the lowest frequencies. Manipulation of this band produces a change in the dynamic range or latitude. The next frequency band $B1(i,j)=I(i,j)-I1(i,j)$ is generated by subtractor 560. This band contains the low to mid frequencies and represents mid-sized features in the image. Manipulation of this band produces a contrast effect without affecting the overall dynamic range. The next frequency band $B2(i,j)=I2(i,j)-I1(i,j)$ is generated by subtractor 570. This band contains the mid to high frequencies and represents the smallest features in the image. manipulation of this band produces a sharpness or blurring effect of the small-sized features in the image. The next frequency band $B3(i,j)=I(i,j)-I2(i,j)$ is generated by subtractor 580. This band contains the highest frequencies in the image and represents very fine detail in the image. Manipulation of this band produces a sharpness or blurring effect of very fine detail in the image.

The higher frequency bands $B1(i,j)$, $B2(i,j)$, and $B3(i,j)$ are multiplied by respective gain terms 591, 592, 593 by respective multipliers 561, 571, 581 and summed together by adders 562, 572, and 582 with the lowest frequency band image $B0(i,j)$ to generate the reconstructed image I'(i,j). The image I'(i,j) is mapped through a tone scale process 590 to produce an output image I"(i,j).

The invention has been described in detail with particular reference to certain preferred embodiments thereof, but it will be understood that variations and modifications can be effected within the spirit and scope of the invention.

PARTS LIST 101 input image
102 tone scale LUT
103 apply tone scale LUT
104 display image on CRT
105 select ROI
106 extract ROI
107 calculate ROI statistics
108 modify tone scale LUT
109 bright light tone scale LUT
110 ROI image
111 apply bright line tone scale LUT
112 overlay ROI image on CRT
120 trend removal
130 spatial frequency processing
140 ROI magnification or true size display
150 storage
201 tone scale LUT
203 mid-level
204 CV aim
205 bright light tone scale LUT
206 beta*(CVmean–CV aim)
208 CV mean
300 radiographic image
302 bright light region of interest #1
304 bright light region of interest #2
510 digital image acquisition unit
520, 530, 540 low-pass filter operators
560, 570, 580 subtractors
561, 571, 581 multipliers
562, 572, 582 adders
590 tone scale process
591, 592, 593 gain terms

The invention claimed is:

1. A method for automatically modifying the rendering of an radiographic image based on an analysis of pixel values within a selected region of interest comprising:
   providing a digital input radiographic image of digital pixel values and tone scale look-up-table LUT;
   creating a default rendered image by applying the tone scale lookup table to the input image;
   displaying the default rendered image;
   selecting a region of interest from the input image;
   computing the histogram of the pixel values within the region of interest;
   creating a bright light image by remapping the pixel values within the region of interest based on an analysis of the histogram and the tone scale table, wherein the tone scale table has been adjusted by one or more of:
   (1) increasing or decreasing the overall contrast by changing the slope of the input tone scale LUT by rotating the tone scale LUT about a central index point of the input tone scale LUT by means of a single rotation process; and
   (2) increasing or decreasing the overall brightness by shifting the tone scale relative to the region of interest histogram; and
   overlaying the bright light image on the default rendered image.

2. The method of claim 1 wherein the tonescale table is further adjusted to produce a reverse grayscale image.

3. The method of claim 1 wherein the overlay of the bright light image is spatially registered with the default rendered image.

4. The method of claim 3 wherein a display of the bright light image is blended with the default rendered image by rendering the overlaid bright light image with transparency.

5. The method of claim 1 wherein displaying the default rendered image includes displaying the image on a color display; and creating a bright light image includes transforming the tone scale lookup table into a pseudo-color palette.

6. The method of claim 1 including the step of processing the region of interest by means of trend removal.

7. The method of claim 6 wherein the trend removal processing includes removing a fitted polynomial surface from the region of interest.

8. The method of claim 7 wherein the fitted polynomial surface is a plane surface.

9. The method of claim 7 wherein the fitted polynomial surface is a quadratic surface.

10. The method of claim 1 including processing the region of interest with spatial frequency processing.

11. The method of claim 10 wherein the spatial frequency processing includes unsharp masking processing.

12. The method of claim 10 wherein the spatial frequency processing includes multiresolution morphological filtering.

13. The method of claim 10 wherein the spatial frequency processing includes multiresolution filtering.

14. The method of claim 1 including magnifying the bright light image; and overlaying includes overlaying the magnified bright light image on the default rendered image such that the center of the original bright light image becomes the center of the overlay image.

15. The method of claim 1 including storing the bright light image with the original image.

16. The method of claim 15 wherein storing includes storing the bright light image as a bitmapped file.

17. The method of claim 15 wherein storing includes storing the placement parameters of the bright light image.

18. The method of claim 15 wherein storing includes storing a database entry that links the original image to the bright light image.

19. The method of claim 1 including overlaying the bright light image on the default rendered image so that the overlay image displays in true size.

* * * * *